United States Patent Office 2,917,118
Patented Dec. 15, 1959

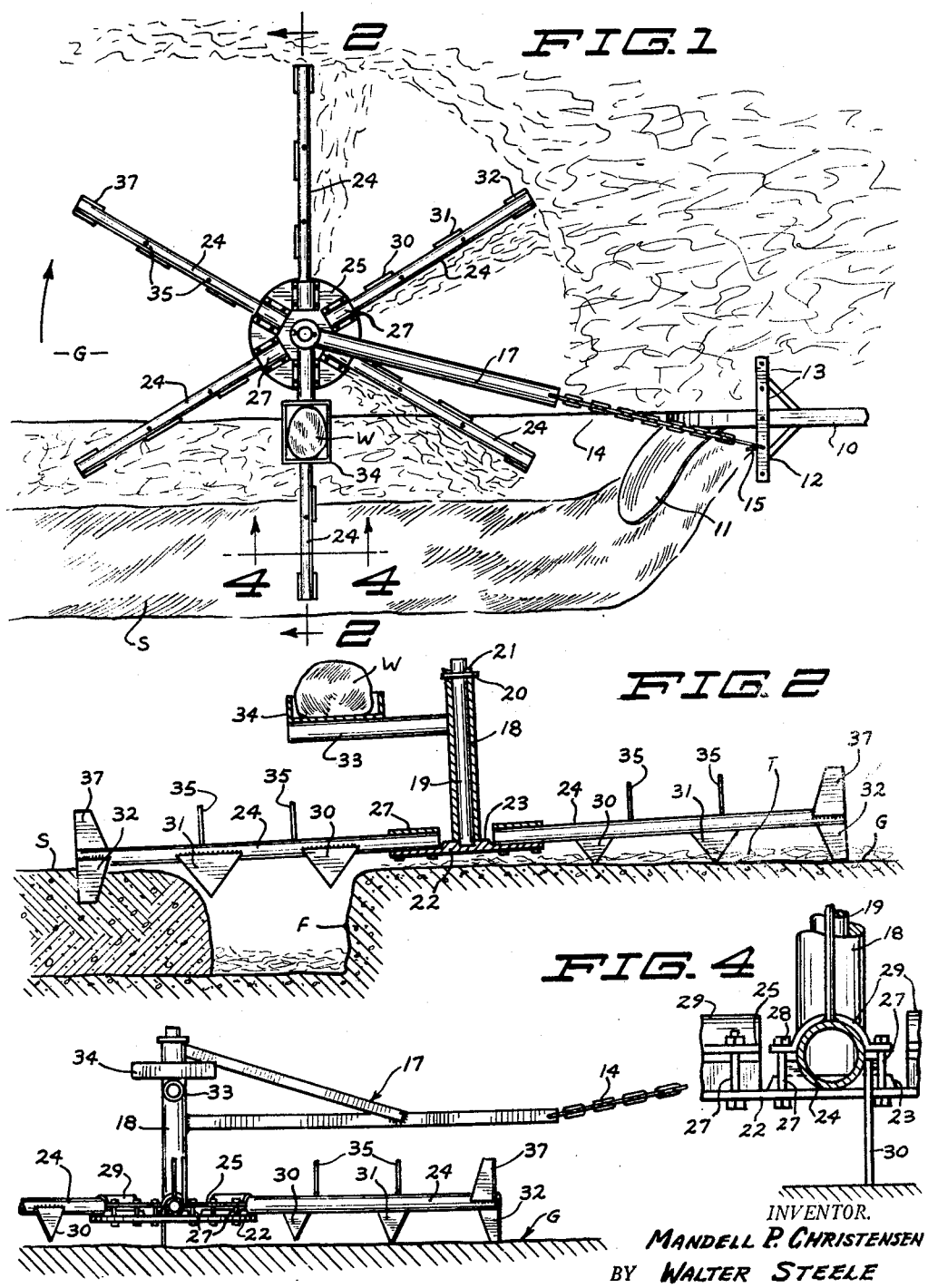

2,917,118

TRASH RAKE

Mandell P. Christensen and Walter Steele,
Albert Lea, Minn.

Application December 28, 1955, Serial No. 555,868

1 Claim. (Cl. 172—525)

This invention relates generally to agricultural rakes and more particularly to improvements in rakes of the rotary type designed to move stalks, vines and other trash from the ground preparatory to the plowing operation.

Rotary rakes are enjoying increased popularity as means of sweeping trash from unplowed ground prior to the plowing thereof. Generally such rakes are hitched to the plow to follow therebehind and move the trash from the strip of unplowed ground adjacent the furrow made by the preceding plow over into the furrow to be covered by the next pass of the plow. Heretofore such rakes have been provided with spike teeth which project downwardly from an annular rim or radial arms mounted to rotate about a vertical center axis. The spike teeth are of an elongated pointed shape and while providing somewhat effective raking action on straw and stalks it is found that they are difficult to use on vines and the like as they tend to ensnarl about the tooth with resultant failure to discharge therefrom at the proper time. It is also found that under certain conditions, such as when the ground is wet and muddy, the spike teeth are too narrow to provide the necessary frictional drag for proper rotation of the rake.

Accordingly, the primary object of the present invention is to provide a trash rake with a new type of raking tooth adapted to effectively move and discharge heavy vines.

Another object of the invention is to provide a tooth for rotary trash rakes which will positively grip the ground to assure uninterrupted rotation of the rake at a constant speed.

Still another object of the invention is to provide a rotary trash rake having radial arms for movement about a central vertical axis, said arms being provided with a plurality of sets of raking teeth, the sets projecting from the arm in different directions and wherein the arms are adjustable about their longitudinal axes for selective positioning of the various sets in raking engagement with the ground.

With these objects in mind the invention broadly comprises a trash rake having a central hub adapted for rotation about a generally upright axis, a plurality of elongated arms extending radially from the central hub, each arm having two or more sets of rake teeth, the teeth of each set being spaced longitudinally along the arm and the sets projecting in opposite directions from the longitudinal axis of the arm, the arms being adjustable about their longitudinal axes for selective engagement of the different sets of teeth with the ground engaged by the rake, and one of said sets comprising teeth which are formed of relatively broad flat plates attached to the arm and tapering in width in their extension from the arm.

Referring now more particularly to the drawing reference numerals will be used to denote like parts or structural features in the different views. In Fig. 1 we have shown the rear end of a tractor drawn plow having a frame 10 carrying a plowshare 11 which works the ground G as it is pulled thereover to leave a furrow F. The soil S removed from the furrow F is turned to the moldboard side of the plow in conventional manner. A hitch bar 12 is mounted crosswise on the frame 10 and is provided with a series of longitudinally spaced apertures 13. A flexible link chain 14 has a hook 15 at its forward end for insertion in one of the apertures 13. The rear end of chain 14 is connected to the forward end of a draw bar 17 which is integrally connected at its rear end with an upright tubular bearing sleeve 18 (Fig. 2). An elongated post or shaft 19 is journaled for rotation in the sleeve 18 and is secured therein against endwise removal at the top by a washer 20 and pin 21 and at the bottom by a large circular hub plate 22 having a raised annular boss 23. Plate 22 is rigidly fixed to the bottom end of the shaft 19 in any suitable manner.

The hub plate 22 has attached thereto a plurality of rake arms 24 which extend from the plate on a common horizontal plane and radially with respect to the axis of shaft 19. The arms are held in place against plate 22 by means of an annular clamp plate 25 which is secured against the top side of the inner ends of the arms by means of bolts 27 which extend upwardly through both plates 22 and 25 between the arms 24 and are secured by nuts 28. Plate 25 has a plurality of circumferentially spaced radially extending channel depressions 29 which open downwardly. These are designed cross-sectionally to tightly engage around the upper periphery of the arm 24, as best shown in Fig. 4. Where the arms are constructed of tubular stock as shown the channels 29 are preferably semi-circular in cross section.

It will be noted that the rake arms 24 are circumferentially spaced about the turning axis of shaft or axle 19. While they have here been shown as six in number it will be understood that a different number of arms may be used. It is found, however, that at least four arms must be used for effective operation of the rake.

Each arm is provided with teeth adapted to perform the raking action. There may be one or more sets of these teeth, the teeth in each set being in longitudinal alignment. In the drawings we have shown a set of our new type teeth in raking position on each arm 24. Each of these sets comprises a plurality of flat plate teeth having their upper edges affixed to the arm as by welding. The plates are spaced longitudinally of the arm and lie on a common vertical plane extending along the rear side of the arm relative to the direction of rotation indicated by the arrow in Fig. 1. The teeth as they are increasingly spaced from the center axle are denoted respectively by the numerals 30, 31, and 32. All of the teeth are tapered downwardly in width, the teeth 30 and 31 preferably tapering to a point at their lower ends. The outermost tooth 32 is designated as a drag tooth and while it has a downwardly tapering design it has a blunt or straight bottom edge for increased frictional resistance with the ground surface.

Teeth 30 and 31 both have the approximate shape of an isosceles triangle with upper or attached edges thereof being somewhat longer than the other two sides so that each tooth is actually wider than it is high. The inner tooth 30 is preferably slightly smaller than tooth 31 for reasons that will shortly be understood.

In operation the rake frame, which comprises the center axle assembly and the radial arms, is hitched to the hitch bar 12 by means of draft bar 17 and chain 14 as shown in Fig. 1. As the plow is advanced over the ground G and the rake is pulled therebehind the teeth on the arms lying to the right of the center line of draft will drag in the loose soil S at the right side of the furrow causing the rake arms at the left of the furrow to move forwardly about the axis of shaft 19, the shaft turning within the bearing 18. An arm 33 is rigidly mounted on the sleeve 18 to extend sidewardly therefrom toward the moldboard side of the plow and carries a tray 34. This tray is loaded with a weight W which tends to depress the right side of the rake insuring a firm grip on the soil S by the rake teeth as they move into the soil.

The rake tends to move to the left of the center line of draft due to the strong frictional drag on the right side thereof. Accordingly, after the initial few feet of travel only the outside tooth 32 on each arm will fully engage the soil S (Fig. 2). This outer tooth, being relatively broad crosswise of the direction of rotation and under pressure of weight W, digs deeply into the loose soil S and presents great frictional resistance from the time it enters the soil until it leaves. The fact that the tooth is formed of a flat plate enables it to slide edgewise into and out of the soil with greater ease.

While teeth 32 bite into the soil at one side of the rake the rake arms and their teeth 30, 31, and 32 on the opposite side perform a raking function. As the arms 24 move to the left behind the turning axis and then forwardly the teeth scrape along the surface of the relatively hard unplowed ground carrying the stalks, vines and the like along with them. As the arms cross in front of the turning axis the trash is deposited in the furrow F to be covered up by the next run of the plow.

The tooth 30 is formed to be somewhat shorter than the teeth 31 and 32. This is to allow full raking engagement of the teeth 31 and 32 with the ground surface G when the rake is in operation in its normal tilted position as shown in Fig. 3.

The shape of the teeth is of primary importance. It is found that with the relatively wide downwardly pointed design the teeth will perform an effective raking job on heavily tangled trash such as soy bean vines. While narrower teeth such as spike teeth will move such trash along the ground it is found that the vines become so completely entangled and wrapped around the teeth that they do not fall into the furrow but are carried around and around on the teeth until such a mass is built up that the rake fails to function. The side edges of our triangular plate teeth are at such a great angle to each other and the teeth are so wide at the top that it is impossible for the trash to become entangled therearound to the extent that it will not fall from the tooth into the furrow.

Tooth 32 also serves as a raking tooth in addition to its function as a drag tooth and it will be understood that its wide but tapering design will also prevent the trash from becoming tightly entangled thereon.

While we have found that the plate teeth will function effectively in moving virtually any type of crop trash, it is known that some operators prefer the use of elongated spike teeth when the rake is used in relatively light flimsy trash such as corn stalks. Accordingly, we have provided our rake arms with second sets of teeth adapted to be selectively placed in ground engaging position. It will be noted in Fig. 2 that each arm 24 has aligned spike teeth 35 and an outer plate tooth 37 which is similar in design to the tooth 32. Teeth 35 are formed of short sections of rod, the attached ends of which extend through and are bolted or otherwise secured to the arm. Teeth 35 and 37 may be diametrically opposite of the teeth 30, 31 and 32 on the arm or may extend at an angle thereto. In the drawings the sets of teeth have been shown as extending in opposite directions. It is found that the angle of extension between the two sets of teeth should be at least ninety degrees.

When it is desired to use the spike teeth in raking position the clamping bolt assemblies 27 are loosened sufficiently to allow the arms 24 to be turned one-half revolution on their longitudinal axes between the plates 22 and 25. The inner ends of the arms, of course, remain in the channels 29. When the various arms have been rotated to the desired positions plate 25 is again clamped down upon them by tightening the bolts 27. The teeth 37 perform the same soil biting and raking functions as the teeth 32 while the spike teeth 35 serve to rake the trash into the furrow in the same manner as the teeth 30 and 31.

It will thus be seen that the rake is readily adjustable between alternate sets of raking teeth for use with different types of trash or under different operating conditions.

The angle of draft of bar 17 and consequently the forward line of travel of the center shaft 19 are dependent a great deal upon soil conditions, speed of travel, and the amount of trash encountered by the rake. Accordingly, the hitch bar 12 is provided with the transversely spaced apertures 13 each adapted to receive hook 15 so that the desired line of travel of the rake might be maintained regardless of these conditions. As heretofore brought out the most satisfactory line of travel is that shown in Figs. 1 and 2 with the teeth 30 and 31 passing over the furrow and tooth 32 gripping the loose soil to the right thereof.

It will be observed that the various plate teeth are secured to the rear side of the carrying rake arm with respect to its direction of movement about the center axis. While this is not absolutely essential, with the teeth so mounted, the arm itself provides a partial barrier to restrain the trash from climbing upwardly over the teeth. In other words, the trash is to a certain degree confined to the forwardly opening elongated radial area lying under each rake arm 24 (Fig. 4).

We have accordingly provided a trash rake which economically and effectively carries out the aforementioned objectives. It is understood that suitable modifications may be made in the structure as disclosed, provided such modifications come within the spirit and scope of the appended claim. Having now therefore fully illustrated and described our invention, what we claim to be new and desire to protect by Letters Patent is:

In an agricultural implement an elongated draft tongue having a tubular bearing rigidly secured to one end at right angles to the tongue, a shaft journaled for rotation in the bearing, a hub plate on one end of the shaft, a clamping plate opposing the hub plate and spaced therefrom axially of the shaft, a plurality of rake arms having their inner ends disposed between the plates and extending in radial directions with respect to the axis of the shaft, plate connecting means intermediate said arm inner ends securing the plates in clamping relation against the arms, said arms having a plurality of sets of aligned rake teeth, said sets extending from the arm in different directions from the longitudinal axis of the arm, and said plate securing means being releasable for selective adjustment of the arms about their longitudinal axes.

References Cited in the file of this patent

UNITED STATES PATENTS

| | | |
|---|---|---|
| 36,892 | Christie | Nov. 11, 1862 |
| 40,741 | Daniel | Dec. 1, 1863 |
| 148,619 | Morse | Mar. 17, 1874 |
| 731,977 | Titus | June 23, 1903 |
| 827,110 | McCann | July 31, 1906 |
| 982,091 | Porteous | Jan. 17, 1911 |
| 2,265,405 | Strantz | Dec. 9, 1941 |
| 2,381,005 | Schultz et al. | Aug. 7, 1945 |

FOREIGN PATENTS

| | | |
|---|---|---|
| 563,261 | France | Sept. 21, 1923 |
| 735,313 | France | Aug. 23, 1932 |